United States Patent
Shimomura

[15] 3,693,405
[45] Sept. 26, 1972

[54] BAROMETRIC ALTIMETER
[72] Inventor: Naonobu Shimomura, No. 13-8 Sakuragawa-cho, Shibuya-ku, Tokyo, Japan
[22] Filed: Dec. 31, 1970
[21] Appl. No.: 103,055

[30] Foreign Application Priority Data
Jan. 7, 1970 Japan .......................45/2426

[52] U.S. Cl.......................................73/384, 73/386
[51] Int. Cl..................................................G01l 7/12
[58] Field of Search........73/384, 386, 387; 235/183, 235/150.2, 150.22

[56] References Cited
UNITED STATES PATENTS
2,745,278 5/1956 Roberts et al............73/384 X

*Primary Examiner*—Donald O. Woodiel
*Attorney*—Clario Ceccon

[57] ABSTRACT

An exponentially changing voltage is compared respectively with a voltage proportional to the atmospheric pressure at a reference altitude and a voltage proportional to the atmospheric pressure at the altitude to be measured and their respective times of equality are measured. The altitude can then be obtained by the time interval because the time interval is shown to be proportional to the difference between the altitude to be measured and the reference altitude.

10 Claims, 9 Drawing Figures

Naonobu Shimomura
INVENTOR.
BY Clario Ceccon, agt

Naonobu Shimomura
INVENTOR.

BY Clario Cecconi, agt

BAROMETRIC ALTIMETER

This invention relates to a barometric altimeter, particularly to a barometric altimeter used for aircrafts.

The principle of a barometric altimeter is based on a fact that the atmospheric pressure decreases as the altitude increases, and the altitude can be obtained by the measurement of the atmospheric pressure. In the conventional barometric altimeter, the atmospheric pressure is derived from the deformation of an air-exhausted metallic box due to the change of the atmospheric pressure, the deformation being mechanically magnified. In a barometric altimeter, for example, which can measure up to 50,000ft., the deformation of the metallic box at the highest altitude is only a few millimeters and the deformation is mechanically magnified by a series of gears so that the needle rotates for 50 turns (1 turn corresponds to 1,000ft.). Thus, a small change in a movable member may produce a large error. This error is not proportional to the altitude and is not decreased at low altitude, and hence an aircraft may get into danger in a low altitude flight. In order that the meter is graduated in equal increments for equal changes of altitude, a logarithmic transformation of graduation is necessary and the mechanical accuracy of the transformation becomes important. A system, wherein the flight height of an aircraft is automatically announced, further has to be provided with an encoder, and if it is desired for the encoder not to influence the altimeter, a complex high-cost encoder of the contactless type such as an optical encoder has to be adopted.

Therefore, the object of this invention is to provide a novel high-fidelity barometric altimeter.

Another object of this invention is to provide a barometric altimeter which produce a digital output signal as well as the information of the altitude.

The barometric altimeter of this invention is composed of means for producing a voltage which changes exponentially with time; means for producing a voltage proportional to both the atmospheric pressure of the altitude to be measured and that of a reference altitude; and means for measuring the time when those voltages are equal to each other.

This invention will be more fully understood by the following description and the attached drawings, in which.

Figure 1:
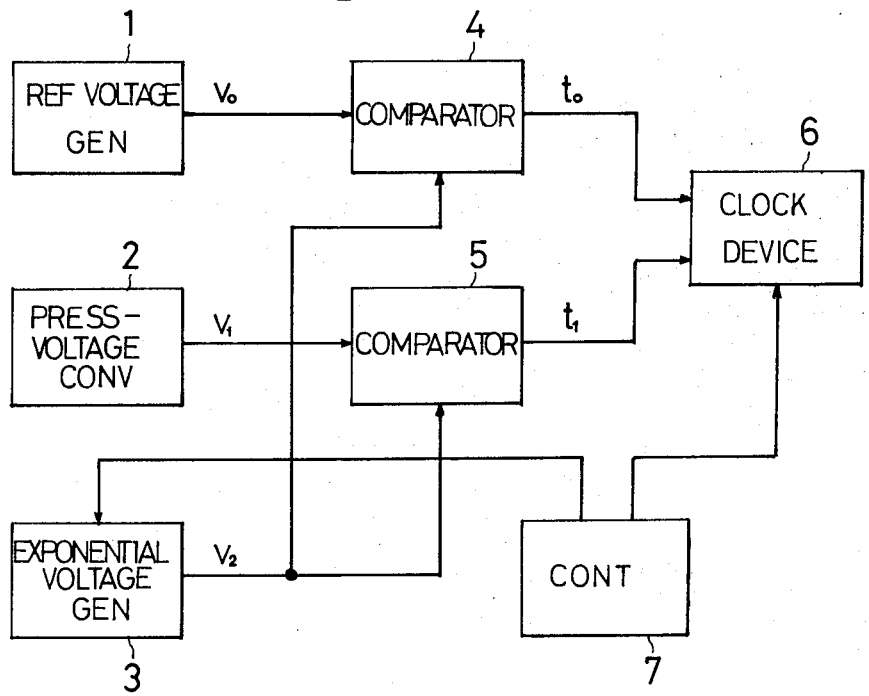
FIG. 1 is a block diagram of the barometric altimeter of this invention.

Referring now to FIG. 1, reference number 1 denotes a reference voltage generator, producing a voltage $v_0$ proportional to the atmospheric pressure $p_0$ at the reference altitude $h_0$. Reference number 2 denotes a pressure-voltage converter producing voltage $v_1$ proportional to atmospheric pressure $p_1$ at the altitude $h_1$ to be measured. Reference number 3 denotes an exponential voltage generator producing voltage $v_2 = Ve^{-ct}$ where $V$ is an initial voltage, $t$ is the time and $c$ is a constant. Reference numbers 4 and 5 denote voltage comparators, wherein the comparator 4 produces a pulse at the time $t_0$ when the output voltage $v_0$ of the reference voltage generator 1 is equal to the output voltage $v_2$ of the exponential voltage generator 3, and converter 5 produces a pulse at the time $t_1$ when the output voltage $v_1$ of the comparator 2 is equal to the output voltage $v_2$ of the exponential voltage generator 3. Reference number 6 denotes a clock device measuring the time interval between the pulses produced by comparators 4 and 5. Reference number 7 denote a controller resetting the indication of the clock device 6 to zero and controlling repeatedly the start of the exponential voltage generator 3.

Figure 2:
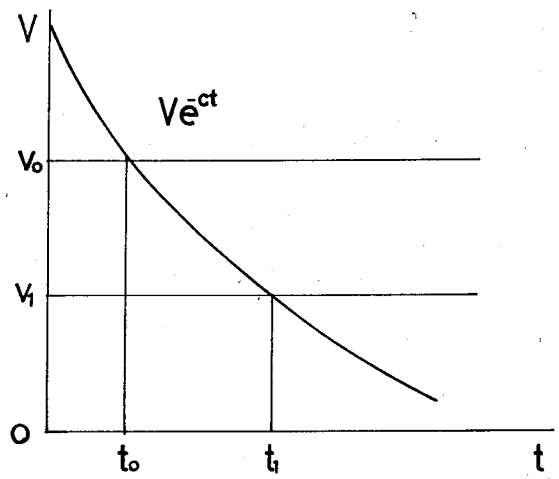
FIG. 2 is a graph showing the change of voltage in the altimeter of FIG. 1.

Referring to FIG. 2, the relation between the above-mentioned voltages $v_0$, $v_1$ and $v_2$ and times $t_0$ and $t_1$ is shown; wherein $$Ve^{-ct_0} = v_0, \quad Ve^{-ct_1} = v_1$$

and hence $$e^{-c(t_1-t_0)} = (v_1)/v_0$$

$$(\log)v_1/v_0 = -c(t_1-t_0) \qquad 1.$$

The relation between the altitude and the atmospheric pressure is given by, $$h_1 - h_0 = k(\log p_0 - \log p_1) = k(\log)p_0/p_1 \qquad 2.$$

where $k$ is a constant determined by the mean temperature.

Said voltages $v_0$ and $v_1$ are proportional to atmospheric pressures $p_0$ and $p_1$, respectively, and hence $$h_1 - h_0 = k\,c(t_1 - t_0) \qquad 3.$$

Thus, the difference between the altitude $h_1$ to be measured and the reference altitude $h_0$ is obtained from the time $(t_1 - t_0)$. Accordingly, if the clock device 6 of FIG. 1 is a frequency counter and the counting frequency is properly chosen, the altitude $(h_1 - h_0)$ can be directly shown in a desired unit.

Figure 3A:
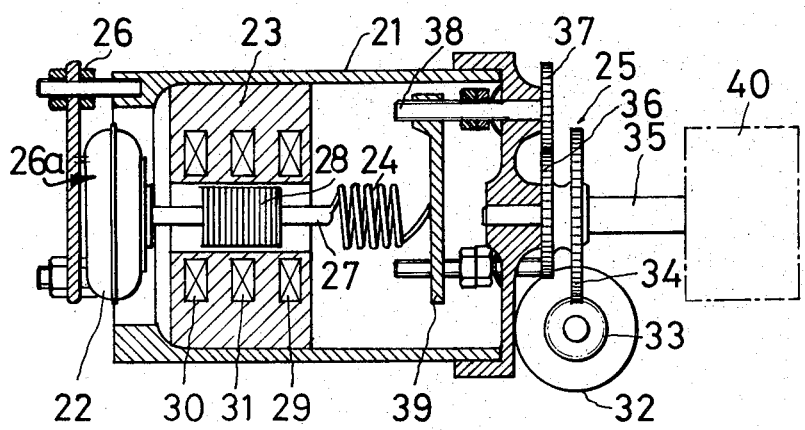
FIG. 3 is an example of an atmospheric pressure-to-voltage converter, FIG. 3a being a cross-sectional side view, FIG. 3b being a left-side view and FIG. 3c being a right-side view.
Figures 3B, 3C:
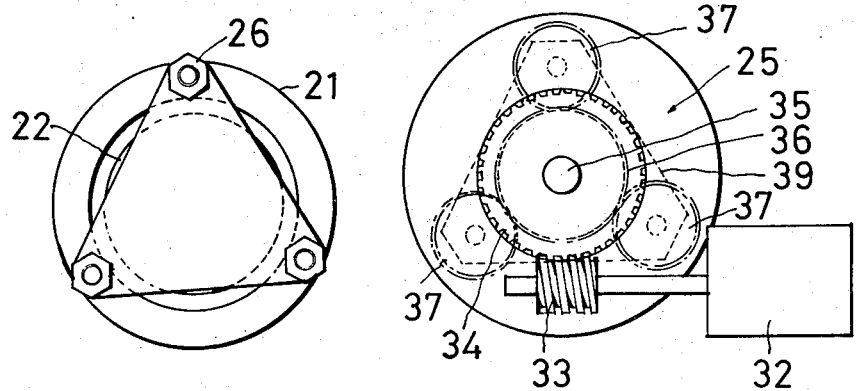
Figure 4:
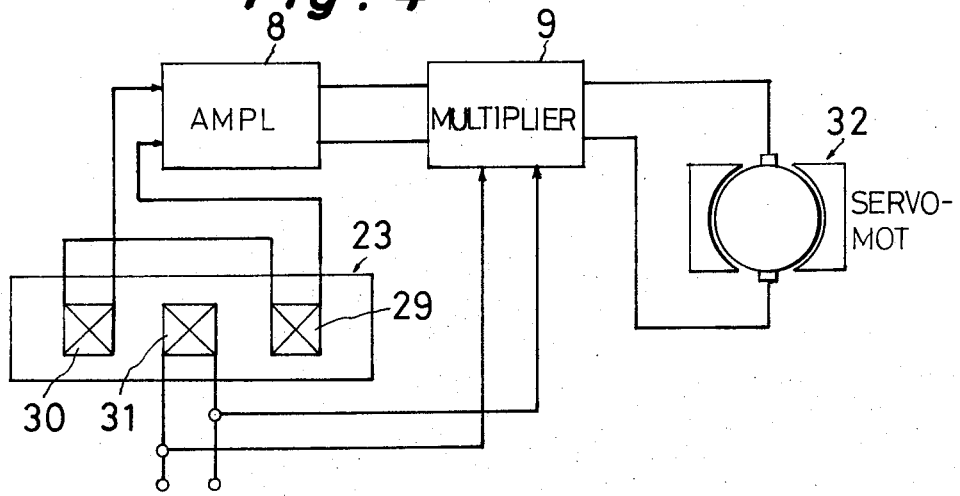
FIG. 4 is a control circuit for said converter.

FIG. 3 shows an example of the converter 2, which includes a housing 21, an air-exhausted metallic box 22, a differential transformer 23, a spring 24, a balancing member 25, an adjusting screw 26, an adjusting plate 26a, servo motor 32 and a potentiometer 40. A side face of the box 22 touches to the adjusting plate 26a and another side face is provided with a rod 27 fixed to a movable magnetic core 28 of the differential transformer 23, and the position of the movable core 28 is adjusted by the adjusting screw 26 so that the output of the differential transformer 23 is zero when the atmospheric pressure is zero (vacuum). The differential transformer 23 is composed of said movable core 28, a primary winding 31 and secondary windings 29 and 30; the primary winding 31 being connected with an AC source of an arbitrary frequency and the secondaries 29 and 30 being connected so as to derive the difference of the induced voltages as shown in FIG. 4. In FIG. 4, reference numbers 8, 9 and 32 denote an amplifier, a multiplier and a servo motor, respectively. A differential voltage between the induced voltages in the secondaries 29 and 30 of the differential transformer 23 is applied to the amplifier 8, and the output of the amplifier 8 and the input voltage of the primary 31 are applied to the multiplier 9. Accordingly, the output of the multiplier 9 is positive or negative as the movable core 28 of the differential transformer 23 is displaced to the left or the right from the neutral position, and the servo motor 32 rotates clockwise or counter clockwise as the output voltage of the multiplier 9 is positive or negative.

The air exhausted metallic box 22 is compressed, for instance, when the atmospheric pressure is $p_1$. The movable core 28 is then displaced to the left, whereby the induced voltage of the secondary 30 becomes higher than that of the secondary 29, and the differential voltage between the both voltages is amplified by the amplifier 8 to be multiplied with the input voltage of the primary 31 by the multiplier 9 so that the servo motor 32 is rotated clockwise. The clockwise rotation of the servo motor 32 rotates the shaft 35 through the worm 33 and the gear 34, and thereby the potentiometer 40 fixed to the shaft 35 and the gear 36 is also rotated clockwise. The gear 36 rotates the screw 38 through the gear 37 and displaces the plate 39 to the right. The displacement to the right of the plate 39 expands the metallic box through the spring 24 against the compression due to atmospheric pressure $p_1$ whereby the movable core 28 is displaced until the output of the differential transformer 23 gets to zero. Thus, the shaft 35 is stopped at an angle after rotating proportionally to the atmospheric pressure $p_1$. The output of the potentiometer 40 is linearly proportional to the angle of rotation and hence it is proportional to the atmospheric pressure $p_1$.

Figure 5:
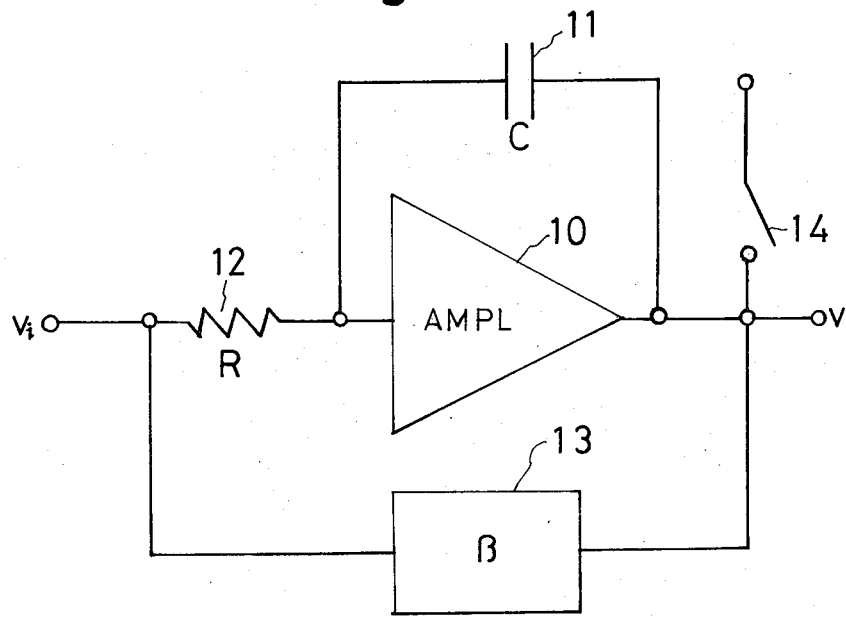
FIGS. 5 and 6 are example of circuits which produce exponentially changing voltages.

The exponential voltage generator 3 may be composed of an integration circuit as shown in FIG. 5, wherein reference number 10, 11, 12, 13 and 14 denote an amplifier, a capacitor, a resistor, a feedback circuit and a switch, respectively. If the feedback circuit 13 is not connected, $$-v_2 = \frac{1}{RC} \int v_i dt$$

where $v_i$ is the input voltage and $v_2$ is the output voltage.

While if the feedback circuit is connected and its feedback ratio is $B$, $$-v_2 = \frac{\beta}{RC} \int v_2 dt$$

If the switch 14 is closed and the voltage $V$ is applied when $t<0$, and the switch 14 is opened when $t=0$, $$v_2 = V e^{-\frac{\beta}{RC} t}$$

Therefore, the constant $c$ in the equations (1) and (3) is given by $$c = B/RC$$

Figure 6:
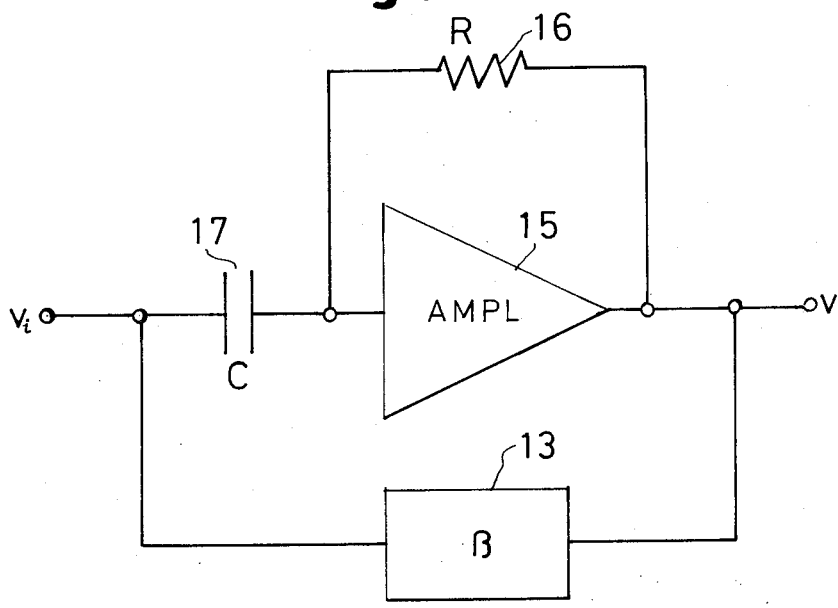

If the exponential voltage generator 3 is composed of a differentiation circuit as shown in FIG. 6, $v_2$ is given by $$v_2 = V e^{-\frac{1}{\beta RC} t}$$

Therefore, $c$ is given by $$c = 1/BRC$$

The voltage $V$ (initial condition) can be arbitrarily determined. The accuracy of measurement is improved when the voltage $V$ is slightly higher than the voltage $v_0$ and the angle between voltages $v_0$ and $v_2$ is large.

Figure 7:
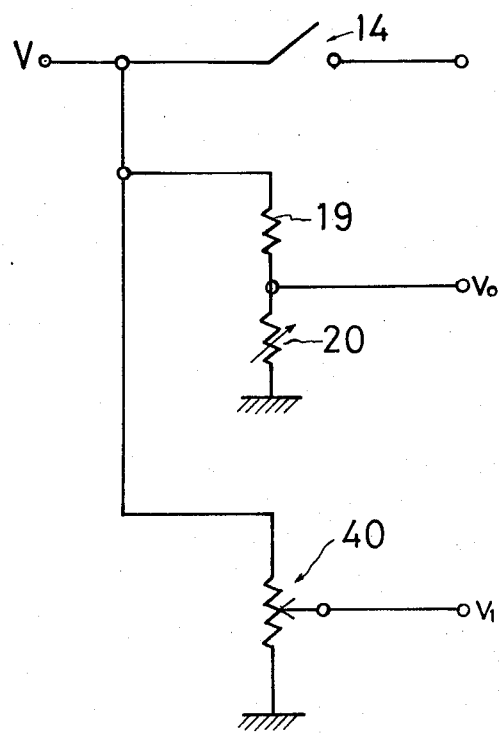
FIG. 7 is a circuit for explaining the relation between those voltages.

FIG. 7 shows the relation between various voltages. An initial condition is given to the exponential voltage generator of FIG. 5 by voltage V through the switch 14, the reference voltage $v_0$ is derived at resistors 19 and 20 representing the reference voltage generator. Voltage $v_1$ corresponding to the atmospheric pressure is derived at the potentiometer 40 at the output of the pressure-voltage converter. The voltage $v_0$ is adjusted by the resistor 20 to be proportional to the atmospheric pressure $p_0$ at the reference altitude such as sea level or the altitude at the taking off or landing place. As shown in equation (1), the barometric altimeter is not affected by a small change of voltage $V$ and an accurate altitude is indicated. The constant $k$ in the equation (3) is proportional to the mean temperature from the ground to the flying height and so the altitude can be directly indicated in the counter if the counter frequency is chosen so as to be proportional to the mean temperature.

The voltage comparators 4 and 5 and the clock device 6 may be conventional ones, the output of the clock device 6 measures the time interval between the pulses of the comparators 4 and 5 and can be taken out as a digital quantity and hence an analog to digital converter is not necessary in the automatic altitude information system.

In the barometric altimeter of this invention, the deformation of the metallic box is not mechanically magnified and the error due to friction is never produced so that the altitude can be measured accurately.

Though this invention has been explained with reference to some embodiments, this invention should not be limited to those embodiments and various modifications are possible within the scope of the spirit of this invention.

What I claim is:

1. A barometric altimeter composed of means for generating a voltage which changes exponentially with time, means for generating a voltage proportional to the atmospheric pressure at the altitude to be measured, means for generating a voltage proportional to the atmospheric pressure at a reference altitude, means for separately comparing said exponential voltage with each of said proportional voltages and producing a respective indication at the time of occurrence of equality of each of said comparisons, and means for measuring the time interval between said indications.

2. A barometric altimeter according to claim 1, wherein said means for generating a voltage proportional to the atmospheric pressure at the altitude to be measured is composed of an air-exhausted metallic box subject to said pressure, a differential transformer coupled to said box and producing a voltage proportional to the physical changes in said box, a servo motor driven by the output of said differential transformer, and a potentiometer rotated by said servo motor.

3. A barometric altimeter according to claim 1, wherein said means for separately comparing comprises a first comparator for comparing said exponential voltage with said voltage proportional to the atmospheric pressure at the altitude to be measured and producing a first output at the occurrence of equality, and a second comparator for comparing said exponential voltage with said voltage proportional to the atmospheric pressure at a reference altitude and producing a second output at the occurrence of equality, and wherein said measuring means comprises a counter capable of counting the time difference between the occurrence of said first and said second outputs.

4. A barometric altimeter according to claim 3, further comprising reset means for resetting said counter after each measurement.

5. A barometric altimeter according to claim 1, wherein said exponential generating means includes an integrating circuit.

6. A barometric altimeter according to claim 1, wherein said exponential generating means includes a differentiation circuit.

7. A barometric altimeter according to claim 2, further comprising means connected to said servo motor for physically returning said box to its initial shape.

8. A barometric altimeter according to claim 2, further comprising means for presetting said potentiometer to a zero readout position when said differential transformer produces a zero output.

9. A barometric altimeter according to claim 2, wherein said differential transformer comprises a primary winding, two secondary windings spaced on either side of said primary winding, a movable core passing through said three windings, a differential amplifier whose inputs are connected to said two secondary windings, and a multiplier whose one input is connected to the output of said amplifier and whose second other input is connected to the input voltage driving said primary winding.

10. A barometric altimeter according to claim 9, wherein said box is physically coupled to said movable core.

* * * * *